F. T. ROBERTS.
METHOD AND APPARATUS FOR MAKING HOLLOW RUBBER ARTICLES.
APPLICATION FILED MAR. 4, 1918.
1,310,439. Patented July 22, 1919
6 SHEETS—SHEET 1.
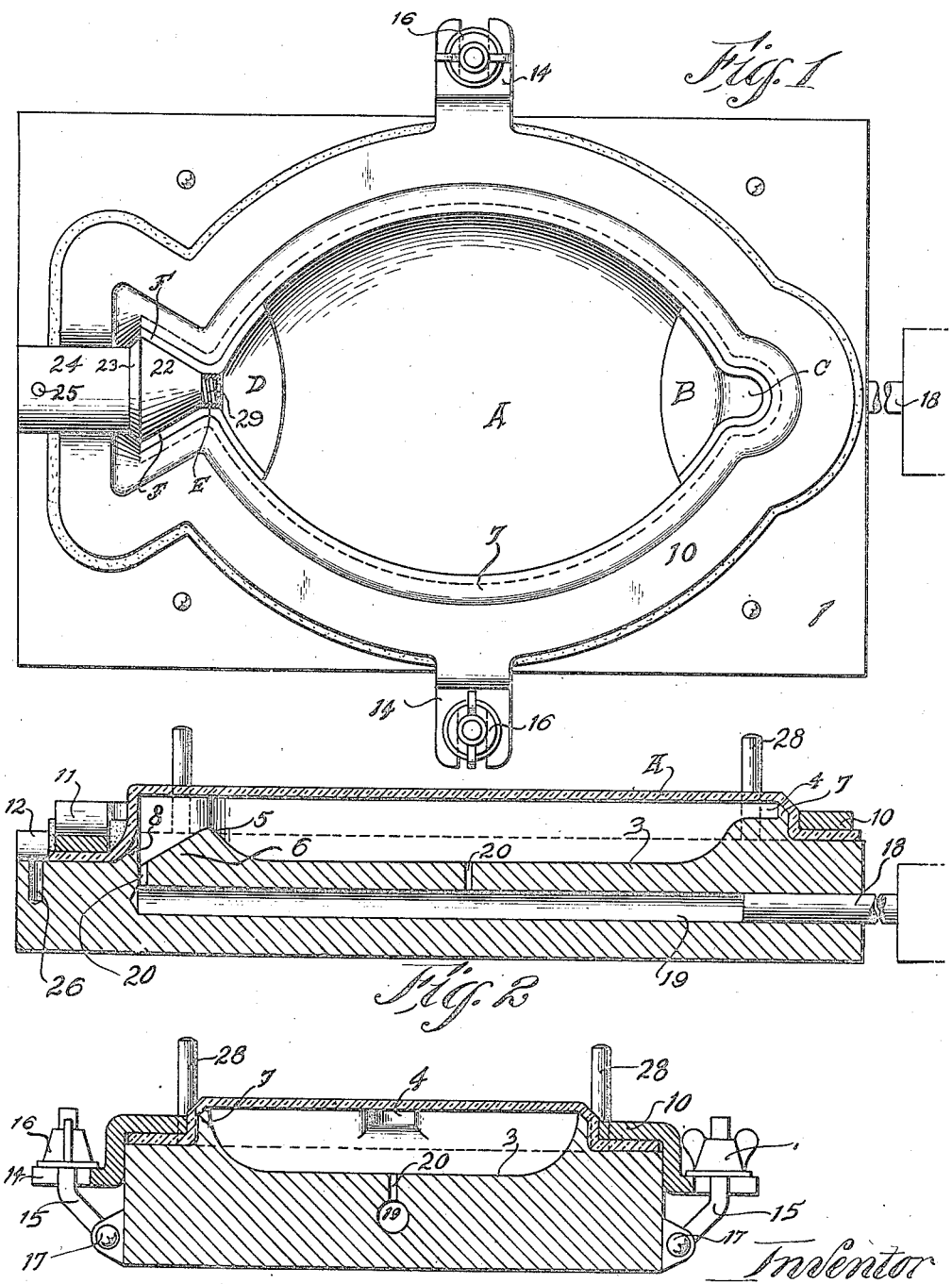

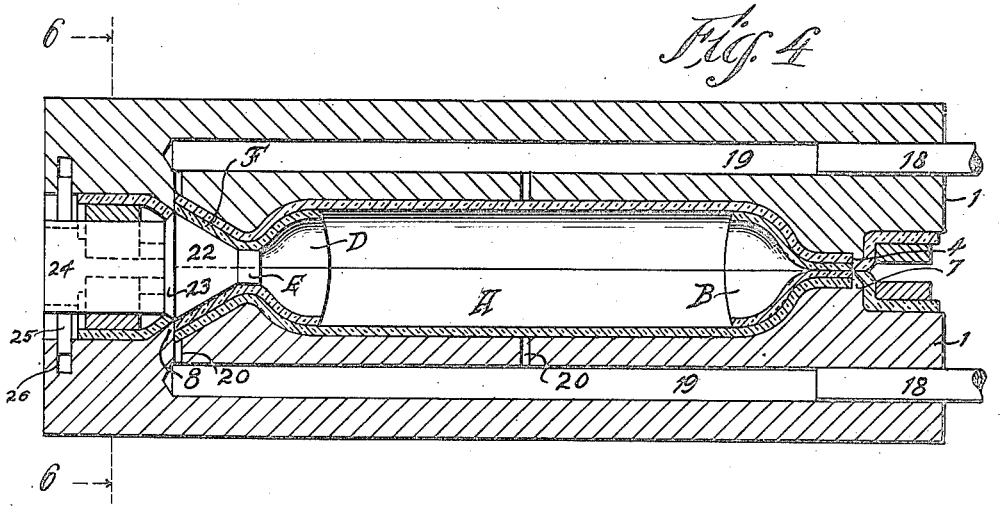
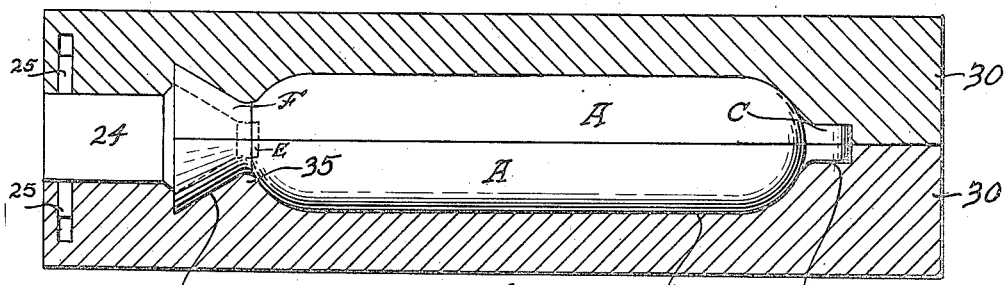
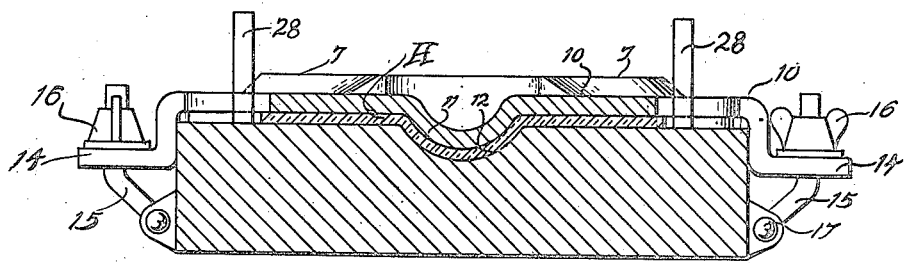

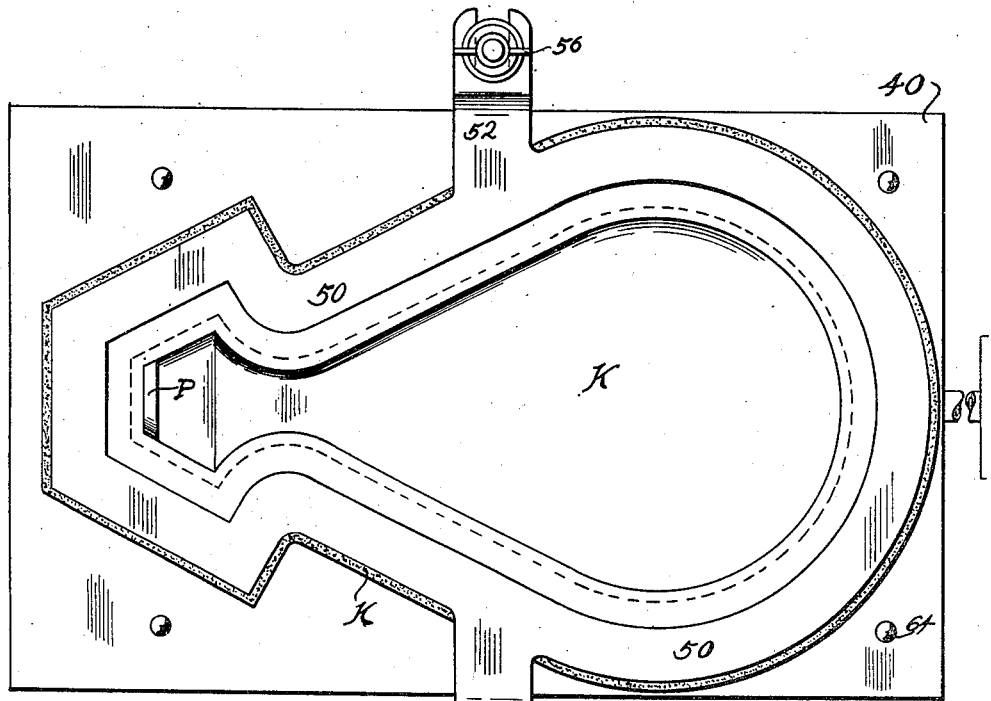
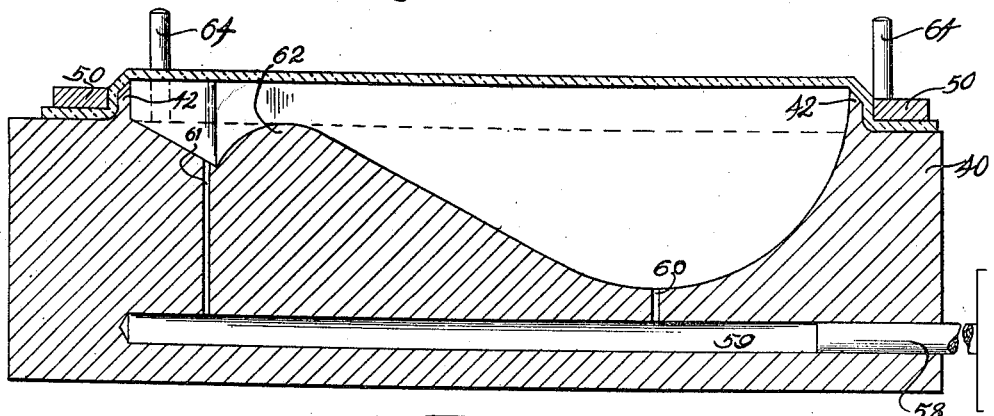

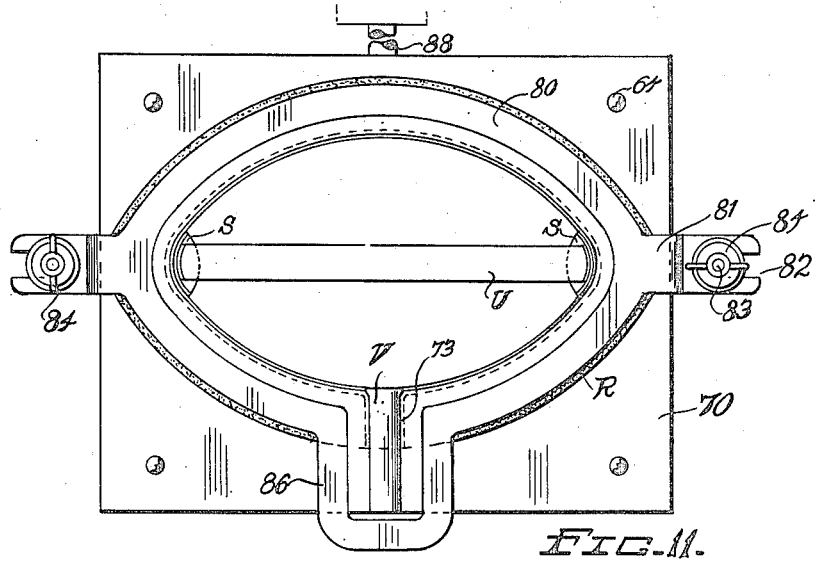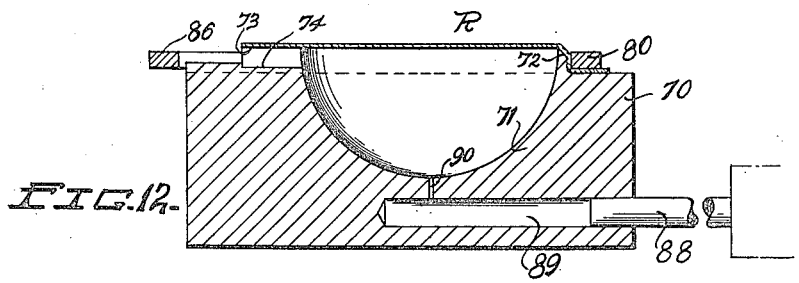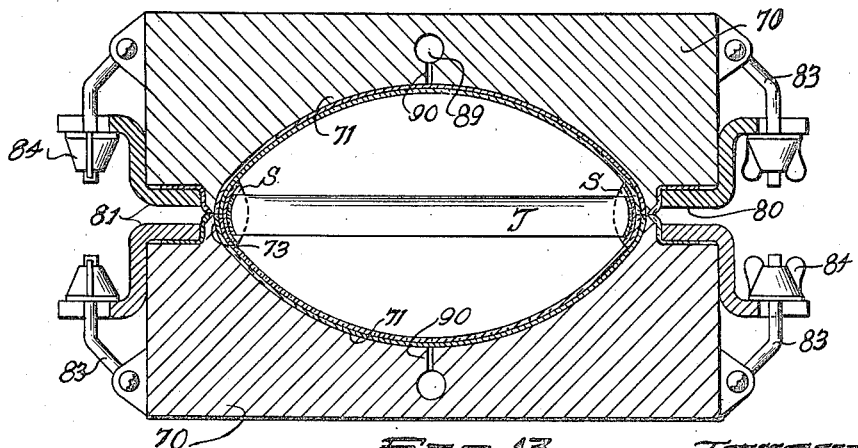

F. T. ROBERTS.
METHOD AND APPARATUS FOR MAKING HOLLOW RUBBER ARTICLES.
APPLICATION FILED MAR. 4, 1918.

1,310,439.

Patented July 22, 1919.
6 SHEETS—SHEET 6.

INVENTOR,
Fred Thomas Roberts,
BY Baker Macklin, ATT'YS.

UNITED STATES PATENT OFFICE.

FRED THOMAS ROBERTS, OF CLEVELAND HEIGHTS, OHIO, ASSIGNOR TO THE PARAMOUNT RUBBER COMPANY, OF CLEVELAND, OHIO, A CORPORATION OF OHIO.

METHOD AND APPARATUS FOR MAKING HOLLOW RUBBER ARTICLES.

1,310,439.      Specification of Letters Patent.     Patented July 22, 1919.

Application filed March 4, 1918. Serial No. 220,288.

*To all whom it may concern:*

Be it known that I, FRED THOMAS ROBERTS, a citizen of the United States, residing at Cleveland Heights, in the county of Cuyahoga and State of Ohio, have invented a certain new and useful Improvement in Methods and Apparatus for Making Hollow Rubber Articles, of which the following is a full, clear, and exact description, reference being had to the accompanying drawings.

This invention is concerned with an apparatus for, and a method of, making hollow rubber articles in which it is necessary or desirable that certain seams, openings or other parts be reinforced with an additional thickness of rubber. The primary object of the invention is to provide a process by which various forms of hollow articles having such reinforcing parts may be made conveniently and rapidly and with comparatively simple molds and other equipment, while producing a desirable and satisfactory article.

A more specific object is to provide a process for making hollow rubber articles having two or more parts united to form a complete article by which reinforcing patches or strips of rubber may be placed on the interior of the article during its construction and become unitary parts thereof, thus leaving the exterior of the article smooth and symmetrical, while obtaining to the fullest degree the function of the reinforcing patches or strips.

Another object is to render the process capable of being practised by the use of simple molds and novel clamping devices which may form a part of this invention.

My invention is hereinafter more fully described in connection with the accompanying drawings, and the essential characteristics are summarized in the claims.

The drawings show three types of hollow rubber articles, a hot water bottle, a syringe bulb, and a football bladder—which are to be considered as illustrative of various types in the manufacture of which my method may be used.

Figure 9:
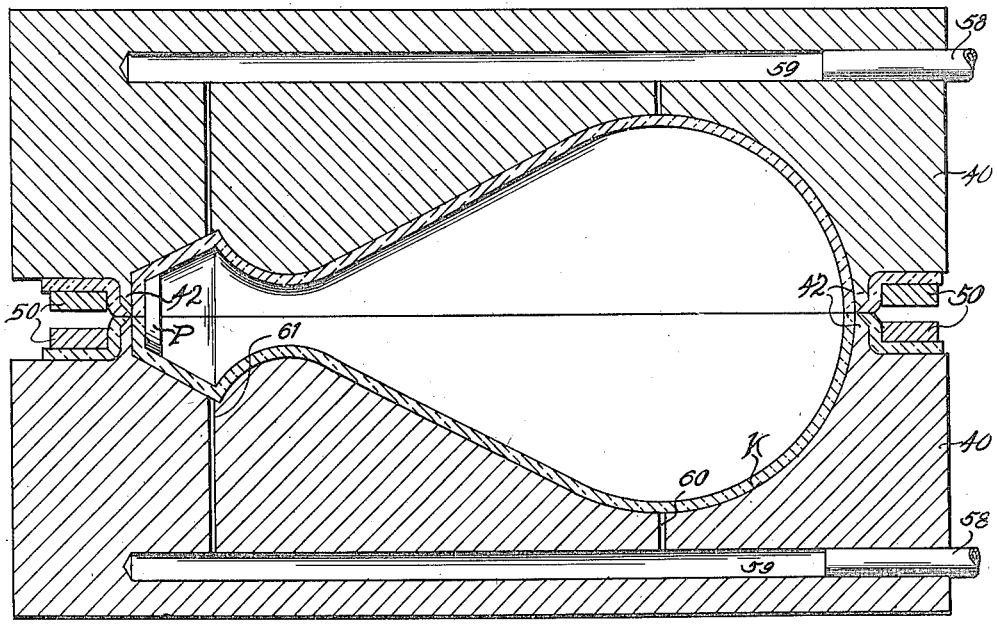
Figure 10:
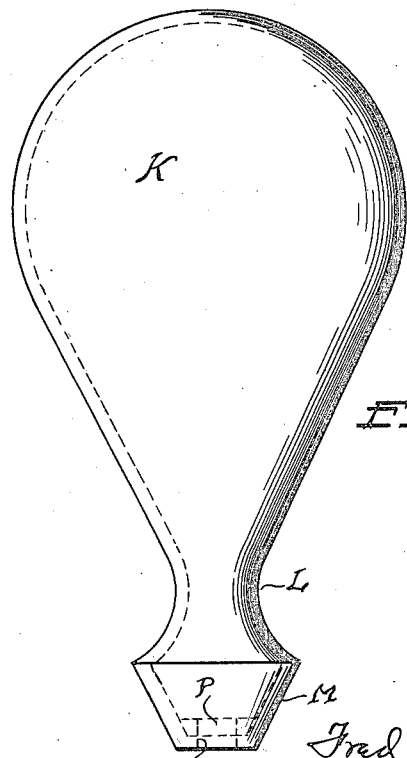
Figure 14:
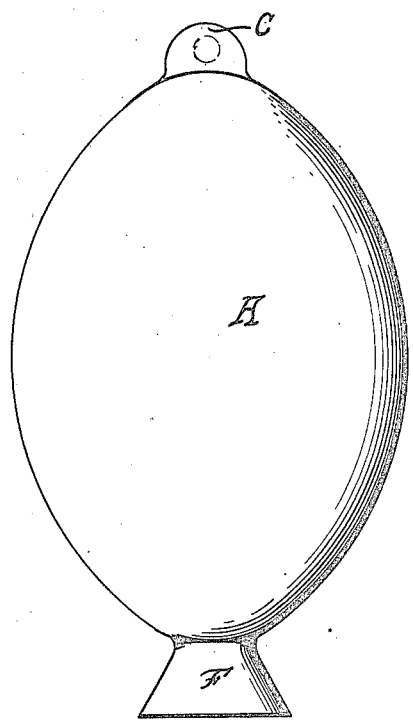
Figure 15:
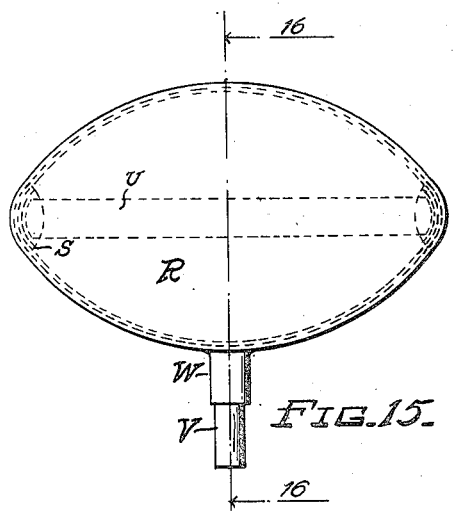
Figure 16:
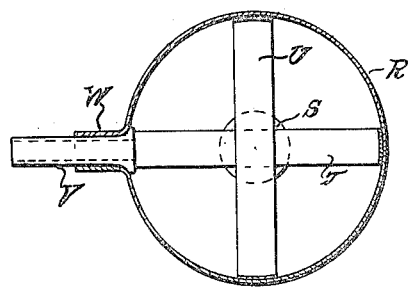

In the drawings, Figure 1 is a plan of a mold member for making hot water bottles with the rubber stock in position; Fig. 2 is a longitudinal section through the same; Fig. 3 is a transverse section at right angles to Fig. 2; Fig. 4 is a longitudinal section through the mold and rubber stock after bringing the coacting mold parts together; Fig. 5 is a similar section of the vulcanizing mold showing the article in elevation in the mold; Fig. 6 is a transverse section substantially on the line 6—6 of Fig. 4, showing the lower mold member only; Fig. 7 is a plan of a mold member for making douche syringe bulbs, showing the rubber stock in position; Fig. 8 is a longitudinal section through the same showing the rubber stock before being drawn down into the cavity; Fig. 9 is a section of the mold parts after being brought together, showing the rubber stock after being drawn tightly to the mold cavity surfaces; Fig. 10 is an outside elevation of the syringe bulb formed by the molds of Figs. 7 to 9; Fig. 11 is a plan of a mold member for forming football bladders, showing the rubber stock in position; Fig. 12 is a transverse section through the same showing the position of the rubber stock before being drawn into the cavities; Fig. 13 is a longitudinal section through the mold members of Figs. 11 and 12 after the stock has been seated and the two parts of the mold brought together; Fig. 14 is an outside elevation of the water bottle made by the molds shown in Figs. 1, 2 and 6; Fig. 15 is an outside elevation of the football bladder made by the molds shown in Figs. 11 to 13, and Fig. 16 is a section through such bladder on the line 16—16 of Fig. 15.

A method of making articles of the types shown in the drawings consists, briefly: First of placing rubber sheets, of approximately the desired thickness of side wall, across cavities of coacting mold members and there clamping them securely, and then drawing the rubber stock snugly into the mold cavity by applying vacuum to the cavity beneath the sheets. The molds are provided with cutting edges entirely surrounding the cavities, whereby when the molds are brought firmly together, they sever the article from the surrounding sheets.

After clamping the rubber sheets across the cavities and drawing them into position, I apply to the sheets in the cavities additional thicknesses of rubber in the nature of patches or seam tabs or like reinforcing parts properly shaped and caused to adhere to the rubber by reason of such rubber as well as the reinforcing parts being of raw rubber stock. By applying the reinforces to the stock after it has been drawn into shape, I am enabled to firmly secure the patches and at the same time form the exterior of the article smooth and symmetrical and without obtrusive additions.

Referring to Figs. 1 to 6 and describing the parts shown by the use of reference characters, 1 indicates a mold plate or block provided with a main cavity 3, substantially elliptic shaped and having a depth equivalent to half the thickness of the hot water bottle in its normal distended position. At one end of the main cavity 3, is provided a recess 4 for forming the closed end of the hot water bottle, at the other end of the recess is a raised portion 5 in the nature of a ridge, the inner surface of which is substantially semi-circular. Beyond this ridge the cavity continues in an outwardly flared conical surface 6 providing a minor cavity for forming the funnel above the neck of the bottle, while the ridge 5 forms the neck.

Entirely surrounding the edge of the main cavity 3 is a raised beveled rib in the nature of a knife indicated at 7. This cutting edge lies mostly in one plane which is at the extreme top of the mold plate, but the portion in such plane terminates at each side of the flared portion 6, being connected at that end by a concave depending knife rib 8 having a semi-circular cutting edge.

In using this mold a sheet of rubber stock A is placed across the surface of the cavity and held in position by means of a clamp, comprising an annular metal strip 10 extending entirely around the mold cavity closely adjacent the raised knife edge 7 and looping downwardly as at 11 in a cutaway portion 12 of the mold member to clamp the mold member adjacent the knife edge 8. This clamping annulus is shown as provided with laterally extending ears 14 preferably bent downwardly and then outwardly to closely embrace the sides of the mold plate 1 and present a slot or bifurcated end to a bolt 15, pivoted at 17 to suitable ears formed on a mold block and provided with a suitable thumb nut 16.

When thus clamped in position vacuum may be applied to the mold cavity beneath the rubber stock through a tube 18 leading to a passage 19 which has communicating openings 20 leading to low points of the mold cavity, the one being preferably in the middle of the body of the cavity and the other at the termination of the conical portion 6. I found that a practical and conveniently obtainable degree of vacuum may be used to tightly draw the rubber stock into the mold cavities bringing the sheet into position shown in Fig. 4. With the rubber stock of the sheet A accurately seated in the mold cavity by the vacuum, I may very conveniently apply the reinforcing sections where desired.

In the case of the water bottle which I am now describing, I prefer to apply patches B to the bottom portion of the bottle and extend them out into the tab portion C, being properly cut to extend from the rubber in the recess 4, outwardly and downwardly into the main cavity as shown in Figs. 1 and 4. This reinforcing patch, preferably has its edges terminating adjacent the high point and in the same plane with the rubber where it is bent over the knife 7 into the cavity. Thus when the mold parts are brought together and the sheet severed by the knives, these patches may unite at the meeting edges as indicated in Fig. 4.

At the neck of the bottle, it is particularly desirable to reinforce the rubber forming the normal thickness of the wall, which I accomplish by the use of patches D cut to extend from the plane of the knife 7 down into the cavity over the ridge 5 and each way therefrom, so that the funnel F of the bottle and the neck and a portion of the body inside the neck, is made of two thicknesses of rubber. The inner thickness may be of any desired weight to accomplish the reinforcing.

In making such bottles, as illustrated, it is customary practice to vulcanize into the neck thereof a metallic threaded ferrule, such as shown in cross section at E. This ferrule is somewhat thimble shaped and provided with an opening, which communicates with the interior of the bottle and is formed with an inwardly turned flange against which the usual threaded plug may seat to form a water tight joint. To position such a ferrule and at the same time accomplish the severing of the rubber stock around the rim of the funnel, I provide means for holding the ferrule, which means also has a surface or edge in alinement with and adapted to coact with the semicircular knives 8.

In the drawings the means for holding the ferrule and severing the stock at the funnel is shown as a conical head 22 provided with a threaded stud 29 engaging the threads of the ferrule E and positioning the same, while the head is conical and conforms to the shape of the funnel, closely fitting the interior of the reinforcing patch D. The conical surface 22 terminates in alinement with the knife 8 and is cut inwardly as at 23 to meet a substantially cylindrical shank 24 positioned by the depressed portion 11 of the clamp and held against longitudinal movement by a pin 25 engaging a hole 26 in the mold plate. When the stock is drawn into position, and the patch at the neck placed as shown, this stock tends to position the inside form 22 while the rib 5 forces the rubber into close engagement with the ferrule.

After the rubber is drawn into the cavity and the patches, and the ferrule positioned, the mold parts (of which the one described is illustrative, as they are substantially duplicates) are brought together, the former 22 being carried by one of them. Dowel pins 28 on one of the mold members enter corresponding guide openings in the other member, thus accurately bringing the knife edges 7 into registration. Now a heavy pressure (hydraulic for instance) is applied to the exterior of the two molds, thus bringing them together in a position shown in Fig. 4, tightly sealing the edges of the stock at the point where it is severed by the knives and causing them to unite entirely around the bottle. At the same time the patches B B and D D are brought together at their edges, and the ridges 5 force the stock tightly into engagement with the exterior of the ferrule. The edge of the surfaces 22 and 23 of the former meeting the knives 8 causes the rubber sheet A to be severed along this edge. The mold members may now be separated and the articles formed placed in a vulcanizing mold, the ferrule E and former 22 being transferred with the article to such mold, which is illustrated in Fig. 5. To furnish the desirable internal vulcanizing pressure some heat-expanding chemical, as ammonia powder, is preferably placed in the lower section of the article after it is seated and before the molds are brought together.

The vulcanizing molds may be merely blocks 30, provided with cavities of substantially the same shape and size as the forming molds, thus having a cavity 31 for the body of the article, a recess 34 for the tab C and a conical cavity 36 for the conical funnel of the bottle while ridges 35 cause the rubber at the neck to closely embrace the ferrule E. The shank 24 of the former for the funnel may be embraced in semi-cylindrical cavities while its pins 25 coact with suitable openings as shown.

It will be seen from the foregoing description that a hot water bottle may be effectively made by my process and apparatus without requiring a solid core about which the bottle is formed. The withdrawal after vulcanization of solid cores usually employed, and the securing the edges around the withdrawal openings, have heretofore been troublesome factors in the manufacture of rubber hot water bottles. By my pneumatic method I entirely do away with this difficulty. I also form the bottle from sheet stock and cut it out mechanically, thus very much reducing the time over the method of cutting the rubber and forming it by hand. The seams made by my method are very tight, and, as there is no disturbance of the bottle in vulcanization, weak spots are eliminated and the life of the bottle correspondingly increased.

One of the important features of my invention is that it enables the applying of the reinforcers wherever desired to the interior of the already formed bottle parts. These reinforcers obtain a close seating, and buckling is prevented, which may result when reinforcers are applied to stock afterward formed.

The tab C is frequently used to carry the bottle and is usually provided with an opening for an eyelet allowing the bottle to be suspended therefrom, with the result that considerable strain may be applied to this tab, which strain is taken through to the body of the bottle very effectively by the inside reinforcing patches B of my method. The neck and funnel of the bottle are also places of most severe wear, difficulties being encountered from frequent cracking and separation at the seams in the vicinity of the neck, whereas I may reinforce the bottle at these points to any desired degree, while providing extra stock for securing the ferrule in position firmly.

Referring next to Figs. 7 to 10 inclusive, the mold members 40 have their cavities arranged to form the syringe bulb illustrated in Fig. 10 and comprising a collapsible body K, a restricted neck L, integral therewith and flaring outwardly, and joined with an inwardly tapered conical head M. The head M is partially closed across the end leaving an opening which fits over the barrel of the syringe in the usual manner. Such opening is indicated at N in dotted lines, at which point the rubber is thickened to provide a suitable embracing surface for engaging the barrel.

One mold member is provided with a cavity for forming one half of this article K, while the opposite member is provided with a similar registering cavity for forming the other half, the halves being united on a longitudinal seam as already described in connection with the hot water bottle. The cavity in each member is surrounded by a raised rib having a cutting edge at 42, the top of which lies in a plane, so that when the molds are brought together as shown in Fig. 9, they may entirely sever the rubber. Rubber sheets are stretched across the cavity and clamped by an annulus of stiff metal indicated at 50 and shown as provided with outwardly extending ears 52 leading to the sides of the block downwardly and horizontally and there provided with slots for receiving bolts 54 on which are threaded suitable thumb nuts 56, as shown in Fig. 7. The bolts may be hinged to the mold block after the manner of the bolts in Fig. 6.

When the stock is first clamped across the mold it lies in a plane as indicated in Fig. 8. Vacuum pipes 58 may lead from suitable means for exhausting the air from the passage 59 which communicates through small passages 60 and 61 with the low points of the cavity in the block, one passage leading to the portion of the cavity forming the body K, while the other leads to the depressed portion, forming the head of the bulb, as shown, while between these depressions is the raised portion or ridge 62 for forming the neck.

After the rubber has been drawn into the cavities by the preponderance of fluid pressure above the stock, a suitable reinforcing patch may be placed in the cavities, as shown in the case of the plug or disk P, within the head M. This plug may be made of raw rubber and placed in the stock in either mold member, and held by reason of its adhesion to the raw rubber sheet. The mold members may then be brought together, being guided by suitable dowel pins 64 on one of the mold blocks and entering coacting guide openings on the other mold block. When heavy pressure is applied to force the molds together, the knife edges 42 meet, with the result that the surrounding sheet is entirely severed from the bulb and the edges thereof are closely pressed together causing them to unite. Thus the article shown in Fig. 10 is formed. This article is then placed on a vulcanizing mold having cavities fitting its exterior and while therein suitably vulcanized. After vulcanization the thickened wall formed by the inward end portion across the head and the plug or disk P may be drilled to provide an opening for the barrel of the syringe.

Describing the use of this process in making football bladders, I refer particularly to Figs. 11, 12, 13, 15 and 16. It has heretofore been difficult, if not quite impossible, to make football bladders with reinforcing strips or tape along the seams in the inside of the bladder. By the use of this method, however, it becomes very feasible to place reinforcing patches at the ends of a ball, and position strips of rubber to overlap the seam or joint between the two halves, thus making a two part ball with the seams reinforced. Such a ball may be folded for shipment and for insertion into the ball cover in the same manner as a four piece bladder heretofore made with seams on the exterior, and without the difficulties arising of the seams catching on the interior of the casing and becoming loosened or torn. These reinforcing rubbers for the seams are merely treated in the same fashion as the reinforcing pieces described in connection with the hot water bottle and syringe bulb.

Another advantage of the use of this method in the making of bladders is that of convenient permanent attachment of the stem of the bladder to the body portion thereof.

In the figures last mentioned, 70 indicates the mold blocks having cavities 71, for forming the bladder and of the same shape and size as the finished article. These cavities are bordered by raised ribs 72 having the beveled knife edges at the rim of the cavity and nearly surrounding the same but being turned outwardly at 73 at each side of a depression 74 for forming a portion of the stem and for receiving the inner previously formed stem member.

Rubber sheets are clamped across the knife edges as indicated at R in Fig. 12, and held by clamps comprising stiff annular metallic members 80, having opposite the ends of the cavity outwardly extending ears 81 leading to the ends of the block and downwardly and provided with a slot 82 for receiving hinged bolts 83 carrying clamping thumb screws 84. A portion of the annulus shown is looped laterally as at 86, extending outwardly past the outer end of the groove or recess 74 for the stem. The rubber sheets R, after being stretched as shown in Fig. 12, are drawn into the cavities by applying vacuum through tubes 88 leading from passages 89 which communicate with the cavity through small passages 90.

When a rubber sheet R, to constitute half of the body of the bladder, has been drawn into a hemi-spheroidal form, (as illustrated in either half of Fig. 13) the reinforcing patches and strips are placed in position. These may consist of substantially circular patches S located at the poles of the spheroid and longitudinal strips T extending from pole to pole about the surface. The patches S and a strip T of raw rubber are placed by hand against one of the seated sheets R adjacent to the edge thereof, so that half of each patch and of the strip overhang the edge of the member R and are adapted to take a similar position against the other half when the mold members are brought together. To more perfectly balance the bladder and further reinforce it, I prefer to provide an extra longitudinal strip U, lying at right angles to the strip T. One half of this strip is applied to one of the seated rubber sheets R and the other half to the other sheet.

The inflating tube V for the bladder is preferably placed about a hollow stem, and this stem with the tube is placed in one of the cavities 73, above the rubber sheet R which has been pressed down into such cavity. When the mold members are brought together they force a portion of body R about the tube V making a reinforcing sleeve, as shown at W in Fig. 16. The elasticity of the patches S and the strip T, tending to cause them to become flat, furnishes sufficient pressure against the half of the article to which they are not originally applied to form a tight junction.

As the reinforces are of raw rubber they form an air tight connection with the body of the article, and accordingly these reinforces may be more firmly seated when in place by supplying compressed air to the interior of the article through the hollow stem.

After the article has been formed, as described, it is vulcanized in any suitable manner. It may be placed in a cavitary mold against which it may be tightly seated by internal air pressure supplied through the hollow stem, or the article may be vented through such stem into approximately flat form and vulcanized by being embedded in a quantity of soap stone. In this case soap stone is preferably employed also in the interior of the bladder, being supplied through the filling tube. The tubular stem is removed either before or after vulcanization according to whether the article is vulcanized flat or in its spheroidal form.

It will be understood from the description I have given of making different classes of articles by my process that it is adapted for the manufacture of various forms of hollow articles and is particularly useful where internal reinforces are desired. The illustration of three different articles is not to be taken as an enumeration of all the articles which may be made by my process, as it is adapted for quite a variety of uses. It will be seen that all of the illustrations given avoid the use of a solid core for the body of the article, and that in each case I seat the rubber by pneumatic pressure in cavities provided for it and secure the reinforces to the sheets after they have assumed substantially their final form. The result is that there is no disrupting of the article after vulcanization to remove a core, and no buckling of the reinforces by a change in shape of the article. Furthermore, a large amount of hand labor, commonly incident to the manufacture of hollow rubber articles, is avoided.

Attention is called to the fact that my copending application No. 241,465, filed June 24, 1918, for a method of and apparatus for making hollow rubber articles, illustrates the manufacture of a hollow rubber article about a mandrel and contains claims directed to such subject matter, some of which also apply to the process and apparatus herein described.

Having thus described my invention, what I claim is:

1. The process of making a hollow rubber article consisting of pneumatically seating rubber stock in mold cavities, bringing two seated portions into conjunction with the edges in engagement and upon an interposed mandrel, severing parts of the stock against the mandrel and transferring the article with the mandrel to a vulcanizing mold, and vulcanizing it.

2. The method of making hollow rubber articles consisting of pneumatically seating rubber stock in mold cavities, placing a mandrel which does not entirely fill the cavity in one of the cavities and bringing the two mold members together to join the parts in edge engagement, and at the same time shearing off some of the stock against the mandrel, then transferring the article with the projecting mandrel to a vulcanizing mold, and vulcanizing it while supplying internal pressure to a particular part of the article not filled by the mandrel.

3. The process of making hollow rubber articles, consisting of pneumatically drawing the stock for a portion of the article into a cavity, applying a reinforce to the interior of the seated stock, bringing such stock into conjunction with other stock, and vulcanizing the article.

4. The process of making hollow rubber articles, consisting of drawing sheet stock by a vacuum into a mold cavity, manually applying a reinforce to the interior of the stock after it is seated, bringing such stock and reinforce into conjunction with other rubber material, and vulcanizing the article.

5. The process of making hollow rubber articles comprising drawing sheet stock into cavities of a pair of coacting mold members, manually applying to each cavity a reinforcing patch terminating adjacent to the edge of the stock, and bringing the two mold members together to form a seam for the sheet stock and for the patches.

6. The process of making hollow rubber articles comprising drawing sheet stock by a vacuum into the cavities of two mold members each provided with a lateral groove leading to the cavity, the stock also seating in such groove, placing a member in the groove of one of the molds after the stock is seated and then bringing the two molds into conjunction, forming a seam at the edges of the cavity for a portion of the distance about it, and forming also outwardly extending seams on opposite sides of the inserted member, and vulcanizing the article.

7. The process of making hollow rubber articles consisting of drawing sheet stock by a vacuum into cavities of two coöperating mold members, each provided with a cutting edge and with an outwardly extending groove, placing in such groove in one of the members after the stock is seated a mandrel, and bringing the other mold member into conjunction with the member first mentioned to cut off the stock around the cavity.

8. The process of making hollow rubber articles consisting of drawing sheet stock by a vacuum into cavities of two coöperating mold members, each provided with a cutting edge and with an outwardly extending groove, placing in such groove in one of the members after the stock is seated a mandrel having a cutting edge, and bringing the other mold member into conjunction with the member first mentioned to cut off the stock around the cavity and across the mandrel.

9. An apparatus for making hollow rubber articles comprising two mold members each having a cavity provided with a lateral groove, a clamp adapted to engage the face of the mold to hold the stock in the cavity, said clamp extending away from the main body of the article on opposite sides of said groove, and a mandrel adapted to seat in the groove after the clamp is in place and the stock seated and adapted to coact with each mold member to press the stock against the same.

10. An apparatus for making hollow rubber articles comprising two mold members having cavities each provided with a lateral groove, a clamp adapted to engage the face of the mold to hold the stock in the cavity, said clamp having a depressed portion engaging said groove, and a mandrel having a shank adapted to seat in the depressed portion of the clamp and having a cutting edge adapted to coact with each mold member to shear off the stock transversely of the mandrel.

11. In an apparatus for making hollow rubber articles, the combination of two co-operating mold members each provided with a main cavity and a minor connecting flaring cavity, means for pneumatically seating stock in said cavities, and a mandrel having a conical head and adapted to coact with stock seated in the minor cavities of the two mold members.

12. In an apparatus for making hollow rubber articles, the combination of two co-operating mold members each provided with a main cavity and a connecting minor flaring cavity, a cutting edge about the main cavity and across the minor cavity, means for pneumatically seating stock in said cavities, and a mandrel having a conical head and adapted to coact with stock seated in the minor cavities of the two mold members and having a transverse cutting edge coacting with the cutting edges extending across the minor cavity.

13. In an apparatus for making hollow rubber articles, the combination of two co-operating mold members each provided with a main cavity and a connecting minor cavity a cutting rib about the edge of the main cavity and continuing onto opposite sides of the minor cavity, a clamp adapted to seat on the face of the mold and hold a rubber sheet drawn across the cutting rib, and a mandrel having a head adapted to seat in the two minor cavities and to coact therewith.

14. In an apparatus for making hollow rubber articles, the combination of two co-operating mold members each provided with a main cavity and a connecting minor cavity, a cutting rib about the edge of the main cavity and the opposite sides of the minor cavity and located in one plane and a connecting cutting rib at the minor cavity extending crosswise thereof and depressed from the plane mentioned, and a mandrel having a head adapted to seat in the two minor cavities and surrounded by a transverse cutting rib to coact with said connecting ribs.

15. In an apparatus for making hollow rubber articles, the combination of two mold members each provided with a dish-shaped main cavity and a connecting semi-conical minor cavity, a cutting rib extending around the edge of the main cavity and on opposite sides of the minor cavity, means for applying a vacuum to the cavities to cause sheet stock to seat therein, and a mandrel having a conical head and a circular cutting edge, said mandrel being adapted to seat in the mold members and have its cutting edge coact with cutting edges carried by the mold members.

16. In an apparatus for making hollow rubber articles, the combination of two mold members each provided with a dish-shaped main cavity and a connecting semi-conical minor cavity, a cutting rib extending around the edge of the main cavity and on opposite sides of the minor cavity, a clamping ring adapted to extend about the main cavity and crosswise of the minor cavity, and a mandrel having a conical head and a circular cutting edge, said mandrel being adapted to seat in the mold members and have its cutting edge coact with cutting edges carried by the mold members.

17. In an apparatus for making hollow rubber articles, the combination of two mold members each provided with a main cavity and a connecting minor cavity, a cutting rib extending about the edge of the main cavity and on opposite sides of the minor cavity, a clamping ring adapted to lie close to the rib and hold sheet stock across the main cavity, means for applying a vacuum to the cavities to cause sheet stock to seat therein, and a mandrel having a head and a transverse cutting edge, said mandrel being adapted to seat in the mold members and have its cutting edge coact with cutting edges carried by the mold members.

18. In an apparatus for making hollow rubber articles, the combination of two mold members each provided with a main cavity and a connecting minor cavity, a cutting rib extending about the edge of the main cavity and on opposite sides of the minor cavity, means for applying a vacuum to the cavities to cause sheet stock to seat therein, and a mandrel having a head and a circular cutting edge, said mandrel being adapted to seat in the mold members and have its cutting edge coact with cutting edges carried by the mold members, said mandrel being provided with a screw-threaded stud at its inner end adapted to carry a thimble and with a shank at its outer end adapted to seat in the mold members and position the mandrel.

19. In an apparatus for making hollow rubber articles, the combination of two mold members each provided with a dish-shaped main cavity and a connecting semi-conical minor cavity, a cutting rib extending about the edge of the main cavity and on opposite sides of the minor cavity and semi-circularly across the minor cavity, and a mandrel having a conical head and a circular cutting edge, said mandrel being adapted to seat in the mold members and have its cutting edge coact with the semi-circular cutting edges carried by the mold members, said mandrel being provided with means at its outer end adapted to seat the mold members and position the mandrel, and a pair of annular clamping members one for each mold member, each consisting of a ring adapted to surround the main cavity and the minor cavity and deflected adjacent to the head of the minor cavity to provide a seat for the mandrel shank.

20. In an apparatus for making hollow rubber articles, the combination of a pair of mold members each having a cavity, means for applying vacuum to the cavity to draw rubber stock into it, a lateral passageway leading to the cavity and on to opposite sides of the lateral passageway, and a pair of clamping rings one for each mold member adapted to lie against the mold member adjacent to the cutting rib and also extending outwardly adjacent to the ribs on the opposite sides of the lateral passageway.

21. In an apparatus for making hollow rubber articles, the combination of a pair of mold members each having a cavity, means for applying vacuum to the cavity to draw rubber stock into it, a lateral passageway leading to the cavity, a cutting rib extending about the cavity and on to opposite sides of the lateral passageway, a pair of clamping rings one for each mold member adapted to lie against the mold member adjacent to the cutting rib and also extending outwardly adjacent to the ribs on the opposite sides of the lateral passageway and crosswise of said passageway, the crosswise portion of each clamping ring being depressed, and a mandrel seating in said depressed portions and coacting with the two mold members.

22. In an apparatus for making hollow rubber articles, the combination of a mold having a cavity with a raised rib extending about its edge, a clamp adapted to engage the face of the mold adjacent to the outer side of the rib, said clamp consisting of a continuous ring provided with outwardly extending ears, and bolts hinged to the mold adapted to engage said ears.

23. The method of making hollow rubber articles consisting of pneumatically seating stock for portions of the article in cavities of two coacting mold members, bringing said members together upon an interposed mandrel lying partly within and partly outside of the article, transferring the article with its projecting mandrel to a vulcanizing mold wherein the projecting portion of the mandrel is engaged and held, and vulcanizing the article in such mold.

24. The method of making a hot water bottle or similar article comprising pneumatically seating sheet stock for two portions of the article in two mold members, and bringing the members together upon a conical mandrel which occupies the neck of the article.

25. The method of making a hot water bottle or similar article comprising pneumatically seating sheet stock for two portions of the article in two mold members, bringing the members together upon a conical mandrel which occupies the neck of the article, and severing the material of the article around the joined seam and transversely across the mandrel.

26. In the method of making rubber hot water bottles and similar articles the steps of pneumatically seating rubber stock for the two halves of the article in cavities having flaring neck portions, and bringing the mold members with their seated stock together about a conical mandrel.

27. In the method of making rubber hot water bottles and similar articles the steps of pneumatically seating rubber stock for the two halves of the article in cavities having flaring neck portions, bringing the mold members with their seated stock together about a conical mandrel, and shearing off the stock around the edges of the article and across the mandrel.

28. The method of making rubber hot water bottles and similar articles consisting of pneumatically seating rubber stock for the two halves of the article in cavities having flaring neck portions, bringing the mold members with their seated stock together about a conical mandrel, transferring the article with its mandrel to a vulcanizing mold, and therein vulcanizing it with the mandrel in place.

In testimony whereof, I hereunto affix my signature.

FRED THOMAS ROBERTS.